Patented Apr. 25, 1939

2,156,124

UNITED STATES PATENT OFFICE 2,156,124

SYNTHETIC RESINS AND NITROGEN CONTAINING ORGANIC COMPOUND ADDITION PRODUCTS

Emil E. Novotny, Philadelphia, Pa., assignor, by mesne assignments, to Durite Plastics, Incorporated, Philadelphia, Pa., a corporation of Pennsylvania No Drawing. Application July 25, 1936, Serial No. 92,640

12 Claims. (Cl. 260—34)

My present invention relates to the manufacture of resins, and more specifically to heat hardening potentially reactive resins.

My invention particularly relates to potentially reactive resins containing organic nitrogen compounds which give to these resins new and useful properties such as more rapid curing, compatibility with oils, avoidance of the liberation of ammonia during the curing cycle, and other new and useful properties as will be described hereinafter. These resins in general belong broadly to the phenol-aldehyde type, but include certain natural resins, modified by my process, as for example gum accroides, dragon's blood, and the like. My process also relates to a new class of, and a new manner of using, hardening agents to produce potentially reactive resins.

In the prior art phenol-aldehyde resins have been made principally by the so-called one-step and two-step reaction processes. Briefly the two-step process consists of reacting a phenol with less than stoichiometric proportions of the aldehyde, and then adding the amount of aldehyde or other methylene body, also known as a "hardening agent", necessary to give a product which, upon further heating will become insoluble and infusible, which Baekeland has described as the "C stage" of the resin. One of the most commonly used methylene compounds or hardening agents for this purpose is hexamethylenetetramine. Where hexamethylenetetramine is used, substantially all of the nitrogen is liberated during the curing cycle as ammonia gas, which, unless sufficient counterpressure is applied, causes the resin to foam so that the cured resin is full of holes or bubbles. Even where counterpressure is applied the ammonia will be largely retained within the piece, building up internal pressure, which greatly weakens the piece, especially at high temperatures. In U. S. Patent 1,187,231 issued to Baekeland on June 13, 1916, an endeavor is made to reduce this evolution of ammonia by substituting salts of hexamethylenetetramine for the hexamethylenetetramine itself. Among such salts are mentioned "hexamethylenetetraminehydrochloride, sulfate, tartrate, oxalate, etc." During the curing cycle these salts are claimed to react to give the corresponding ammonium salt, as for example ammonium chloride, sulfate, etc. I have found, however, that the presence of such salts tend to weaken the structure because such salts are not soluble in or compatible with the cured resin, and furthermore because many of them are hydroscopic they tend to absorb an excess of water, and further weaken the product, or to "sweat out" and to impair the electrical properties.

I have discovered types of nitrogen containing compounds, and a manner of using them which not only avoids the evolutions of ammonia during the curing cycle of the resin, but also avoids the disadvantages of the presence of ammonium salts in the molded article, and furthermore by my manner of using these new materials, I am able to provide potentially reactive resins having totally new and useful properties such as, for example, rapid curing to a dense mass substantially free from bubbles; products which can be molded cold and cured without counteracting pressure to produce articles having properties akin to the present hot molded articles; potentially reactive resins that are compatible with drying oils, "self lubrication" resins; products having heretofore unattainably high strength at high temperatures etc. as will be described hereinafter.

I have found that hexamethylenetetramine is capable of reacting with polybasic acids wherein the number of hexamethylenetetramine groups is less than the number of acidic groups. Thus in the case of mono-hexamethylenetetramine-trihydrogen phosphate we can fix just three times as much (200% or more) ammonia as would be fixed by the normal tri-hexamethylenetetramine-tri-hydrogen phosphate. In this manner almost no ammonia is evolved in the hardening reaction. This is readily apparent when films of resin are spread on to a hot plate at a temperature of approximately 300° F. and it will be found that where ordinarily the film would bubble and blister in this case the product provides a solid homogeneous film.

Another class of compounds producing hardening agents of the addition type is based upon compounds which to my knowledge have heretofore been unknown and are formed by reacting hexamethylenetetramine with an acid in the presence of free aldehyde which in the case of formaldehyde results in the formation of a hexamethylenetetramine - acid - formaldehyde compound, e. g., hexamethylenetetramine-nitrate-formaldehyde. In these compounds the ratio of methylene groups to nitrogen is greater than the six to four ratio (6:4) occurring in hexamethylenetetramine so that per unit reactive methylene groups less nitrogen is potentially capable of being evolved in the first place and, simultaneously, the acid will fix more or less of the ammonia and a still greater quantity if the acid be a suitable haloid substituted one or one containing reactive unsaturated linkages. The acid groups such as carboxyl groups, groups containing unsaturated linkages and groups containing halogens are examples of what may be conveniently referred to as potentially reactive and available ammonia (NH$_3$) or nitrogen N≡ fixing groups or structures in that they are capable of reacting with the ammonia or nitrogen of the hexamethylenetetramine complex to form relatively stable products and thus "fix" the nitrogen that would otherwise be evolved (usually as ammonia) during the curing cycle. It will be noted that in these compounds the ratio of the number of methylene groups to the number of nitrogen N≡ atoms minus the number of reactive and available ammonia (NH$_2$) or structures is greater than six to three. Many of the compounds of this class are furthermore also preferable as hardening agents compared to hexamethylenetetramine-hydrochloride, sulphate, etc., in that these compounds readily fuse and thus aid in fluxing the resinous mass, increase the flow thereof and make ideal plasticizing agents.

Other hexamethylenetetramine addition compounds are formed by reacting various polybasic acids with a metallic radical and hexamethylenetetramine resulting in the formation of compounds, such as for example di-hexamethylene-tetramine-magnesium di-hydrogen-oxalate. It has been found that these compounds are more compatible with the resinous mass not only acting as good hardening agents but promoting plasticity, flow, etc., better than the corresponding non-metal containing hexamethylenetetramine salts.

Furthermore, nitrogen may be combined in the form of an organic nitrogen compound acting as a hardening agent and fluxing and plasticizing agent and being compatible with the resin produces a marked improvement in strength. As a typical example of this type of compound I would mention mono-hexamethylenetetramine dihydrogen-phthalate. These compounds are especially useful in cold molding or where a great deal of flow is desirable during a hot molding operation, and for molding thick sections, where considerable time is required for heat penetration, in that they give products having a rather slow reaction thereby providing sufficient time for flow or heat penetration before the product sets. This slower rate of cure is a marked advantage in that more time is given to flux the product without the difficulty of the melting point increasing more rapidly than the temperature gradient during the hardening reaction. Thus for some purposes these products are ideal particularly in cold molding and for other molding purposes they may be considered as combined hardening agents and plasticizing agents imparting hardness, plasticity and strength to the final ultimate product.

Another class of hexamethylenetetramine addition compounds possesses marked lubricating properties and in these the hexamethylenetetramine salts replace in part or wholly the more commonly used lubricants such as the metallic soaps, that is the stearates of calcium, magnesium, aluminum, etc. These compounds are obtained by heating (or reacting if heat is unnecessary) hexamethylenetetramine with the higher molecular weight fatty acids. These fatty acids comprise those of a saturated or unsaturated nature, mono- or poly-carboxylic with or without substituted groups and possessing a number of carbon atoms in excess of eight. As a specific example I might mention the hexamethylenetetramine stearate, oleate, linoleate, palmitate, laurate, sebacate, as well as the fatty acids derived from castor oil, tung oil, etc. These compounds thus act as both hardening agents and as lubricants and they carry a greater amount of fatty acid and may be used where extra fatty acid plasticizing agents are called for, but where conditions are such that the fatty acids will be compatible and will not sweat out. These addition compounds may be considered as a type having definite lubricating values while also acting as hardening agents.

The advantage of this type of lubricative hardening agent over the more commonly used metallic soaps is the fact that no inorganic ingredient is used in the mass and the hardening capacity is such that the amount of hardening agent used may be proportionately reduced. These compounds also possess an advantage over the use of the acid salts of hexamethylenetetramine in that the physical properties of the hexamethylenetetramine compounds, such as hardness, melting point, etc., are such that they lend themselves to a very ready incorporation into the resinous mix and this may be done while the resin is in a liquid phase or in solution and after having been pulverized these products readily provide additive coatings on to the pulverized resin grains which is a part of my invention as explained hereinafter.

In the hardening of resins through the use of a hardening agent as heretofore practiced either ammonia is liberated or else ammonium salts are formed the presence of which salts I have already referred to as being detrimental to the finished product. It has been found that the nitrogen can be fixed in the form of organic nitrogen compounds which are compatible with the resinous structure. It has been discovered that when using certain types of acids such as phthalic, etc., instead of getting the expected ammonium salt we obtain nitrogenous organic compounds. This result was wholly unexpected for it has generally been supposed that organic acid addition products of hexamethylenetetramine react in a manner analogous to the inorganic acid addition products to form the corresponding ammonium salts, that is, just as the hydrochloride would yield ammonium chloride it has been supposed for example that the phthalate would yield ammonium phthalate. Through extensive tests I have discovered that this does not take place to any appreciable extent when certain particular acids are used. That is I have found that the reaction mechanics of hexamethylenetetramine addition compounds depends upon the physical and chemical character of the acid used. Whereas the hexamethylenetetramine salts of sulphuric, hydrochloric, hydrobromic, phosphoric, acetic, propionic, etc., yield ammonium salts, other acids such as citric, maleic, formalic, phthalic, salicylic, etc., yield organic nitrogen containing compounds instead of the ammonium salts. This discovery of the formation of organic nitrogen compounds in lieu of ammonium salts is of considerable importance in that these nitrogenous organic compounds seem to become an integral part of the resinous structure yielding what we may call a nitrogenous resin, whereas when the simple ammonium salts are gotten the already referred to disadvantages are met with.

Still another improvement is based upon the use of materials which can fix ammonia by virtue of factors other than the presence of acidic groups which combine with ammonia. This end may be achieved by using haloid substituted acids as well as compounds possessing reactive unsaturated linkages. In this manner the ammonia fixation is dependent not only upon the presence of acidic groups, but also upon the presence of other groups or linkages capable of fixing ammonia, and thus a greatly increased capacity to absorb ammonia is brought into play. Representative of the types of acids suitable for this purpose are unsaturated acids such as crotonic, oleic, as well as the chlor substituted acids such as tri-chlor-acetic acid.

Heretofore few effective hardening agents that are soluble in oils such as tung oil, linseed oil, etc., were known. Hexamethylenetetramine is one of the most effective hardening agents known, but unfortunately it is virtually insoluble in such oils so that when two-stage oil soluble phenol-aldehyde resins are dissolved in these oils it is difficult to secure effective hardening. It has now been found that certain hexamethylenetetramine addition compounds are soluble in these oils. Specifically I may mention hexamethylenetetramine oleate and the hexamethylenetetramine salts of linseed oil fatty acids, tung oil fatty acids, etc. It appears that the most suitable compounds for any specific type of oil are those derived by reacting hexamethylenetetramine with the fatty acids derivable from such an oil. Many of these fatty acids especially in the presence of so-called "driers" have the property of absorbing oxygen and passing into a resinous more or less solid mass—the linseed oil fatty acid as well as tung oil fatty acids are examples of this type. Thus we not only introduce a hardening agent, but at the same time in so doing use a material which is capable of being hardened by oxidation.

I describe specific uses for these resins containing organic compound addition products as hardening agents in my co-pending application Serial No. 90,490, filed July 14, 1936, wherein I describe cold and hot pressing methods in the manufacture of synthetic resin bonded abrasive articles and in my co-pending application Serial No. 90,489, filed July 14, 1936, I describe a resinous liquid composition or liquid resin which has a co-acting relationship to the resins I describe herein.

Hexamethylenetetramine as a hardening agent is quite generally used on the basis of usually 10 per cent by weight of the resin which is to be hardened. This hexamethylenetetramine is a mere admixture of resin particles, that is it comprises a heterogeneous mixture comprising particles of both the hexamethylenetetramine and the resin.

I have discovered, however, that hexamethylenetetramine in the presence of pulverized phenol resin if ball milled with the resin in the presence of sufficient moisture will form a hexamethylenetetramine-phenol resin addition product that forms as a coating on the resin particles. This product hardens more quickly upon heating and while no other combinations are made to suppress the liberation of ammonia, the liberation of ammonia is greatly reduced. That this is an addition product is readily evident as hexamethylenetetramine alone or in mere admixture with the resin is freely soluble in water whereas this hexamethylenetetramine-phenol resin addition product is no longer water soluble or only slightly water soluble. This what I term direct addition product with the resin is useful for many purposes and particularly useful in cold molding and most particularly so where an aqueous alkaline liquid resin is used as a preliminary coating liquid for the filler. This is described in the two co-pending applications previously referred to. The fact that hexamethylenetetramine in the presence of water and in the presence of phenol resins readily forms addition products provides a simple means whereby the expense of producing dry hexamethylenetetramine which is an expensive operation can be dispensed with. During the manufacture of the resin while water is still present the temperature of the resinous mass in the kettle is brought down to a point below say 175° F. and preferably to a point as low as 100° F. and may even be as low as room temperatures. The hexamethylenetetramine is formed through the addition of the required amount of formaldehyde and ammonia and as formed the water soluble hexamethylenetetramine addition product combines with the resin and as the product is no longer water soluble the excess water may be decanted and the product dried quickly and economically.

For purposes where products are desired having a great tensile strength at temperatures around 400° F. and higher, as at the surface of a grinding member while in operation where heat is continually generated, I prefer as a hardening agent, products which eliminate or minimize the presence of ammonia salts, these hardening agents being used preferably as coatings on the pulverized resin and in most cases such coatings will likewise be addition products therewith. Therefore hexamethylenetetramine while useful is preferably substituted for by its addition compounds, particularly those that are so constituted as to liberate a minimum quantity of ammonia in the hardening reaction, a property possessed to a slight degree by the normal salts of hexamethylenetetramine, that is hexamethylenetetramine hydrochloride, sulphate, etc., but more particularly by specific hexa addition compounds of acids comprising a group such as mono- or di-hexamethylenetetramine-hydrogen-oxalate, mono - hexamethylenetetramine-hydrogen-phthalate, mono-hexamethylenetetramine - hydrogen - phosphate, di - hexamethylenetetramine-hydrogen-tetra-borate, etc.

When using a compound such as mono-hexamethylenetetramine-hydrogen-oxalate as a coating on the abrasive grains, as through the use of Durite No. KV-1000-B, the product mixes better and suspends itself more uniformly on the grains when using the low viscosity coating solution and the product dries out from a wet to a dry workable mix using the same proportions of coating agent and dry resin almost instantly, whereas the straight hexamethylenetetramine addition compound requires approximately 15 minutes time to dry to a workable mix. This resin has a high acid value (43 ml. normal NaOH to 100 gr. resin) and it is believed that this is also a factor in making the wet mixture dry out quickly. Resins of an acid nature having a pH value lower than 7 are especially useful in making the wet mixture dry out quickly and the addition of acid bodies to resins which normally have a low acid value or may be neutral or alkaline are also useful to quickly convert the mixture to a dry workable state.

Out of a large number of compounds the hardening agent addition product to the resin which gave most consistent strengths while hot was obtained by ball milling with the pulverized resin say roughly 5% of the resin weight in hexamethylenetetramine and then adding another 5% comprising chiefly mono-hexamethylenetetramine-hydrogen-oxalate and a small percentage as a plasticizer and hardener of mono-hexamethylenetetramine-hydrogen phthalate, thus producing in situ an equivalent of di-hexamethylenetetramine-hydrogen-oxalate plus the phthalate plasticizer.

These special resin products are likewise valuable because little or no ammonia is liberated during the oven hardening treatment, there is less bloating and chiefly because the finished product has high strength both hot and cold.

In general the hexamethylenetetramine addition products are made by reacting hexamethylenetetramine with the acid in the proper proportions. The hexamethylenetetramine addition product, furthermore, can be produced as a relatively water insoluble coating on pulverized resin grains, such as for example a phenol-aldehyde resin, by a thorough ball milling and spreading of hexamethylenetetramine over the resin surfaces. The addition product is desirable and the precise procedure that yields the best results with regard to efficiency, convenience, purity and safety depends upon the physical and chemical characteristics of the specific acid and the corresponding hexamethylenetetramine addition compound to be produced. It is for this reason that no specific rule may be given which will produce addition compounds applicable to the use of all acids. It is for this reason that a few typical examples are given by way of illustration and not limitation and the chemist versed in the art can readily work out methods suitable for each specific type of acid used. The specific illustrative examples follow.

*Example I — Mono-hexamethylenetetramine-di-hydrogen-oxalate*

The following illustrative method of making utilizes the limited solubility of hexamethylenetetramine-di-hydrogen-oxalate in water and also utilizes the fact that free formaldehyde tends to shift the equilibrium in aqueous solution between ammonia and formaldehyde on the one side and hexamethylenetetramine on the other side, favoring in maximum concentration of hexamethylenetetramine and minimizing the effects of hydrolysis and decomposition. The method comprises the steps of first preparing a solution of water containing about 15 per cent of 40% formaldehyde solution, next saturating this solution with mono-hexamethylenetetramine-oxalate and then to this solution there is added hexamethylenetetramine and a molecular equivalent thereof of oxalic acid, the mixture being vigorously stirred and mono-hexamethylenetetramine-di-hydrogen-oxalate is then formed and under these conditions precipitates out of the aqueous solution and is removed from solution by filtration or centrifuging. This product provides a moist cake of the mono-hexamethylenetetramine - di - hydrogen-oxalate containing some water and some formaldehyde. This moist product is preferably washed with a little acetone prior to drying in a vacuum oven at a temperature of from 212 to 250° F. with preferably a 20 to 24 inch vacuum. The acetone is recovered. The mother liquor is again brought up to normal for a subsequent batch by adding an equivalent amount of water and formaldehyde to keep the volume of the liquid substantially constant.

This product constitutes the dry pulverized hardening agent addition product of hexamethylenetetramine or the mono-hexamethylenetetramine-di-hydrogen-oxalate.

If instead of water containing a relatively small percentage of formaldehyde a concentrated solution of formaldehyde were used we would not produce mono-hexamethylenetetramine-di-hydrogen-oxalate, but a triple addition compound would be produced, namely mono-hexamethylenetetramine - di-hydrogen - oxalate - formaldehyde. This is a well defined crystalline compound which may also be used as a hardening agent.

*Example II—Mono-hexamethylenetetramine-di-hydrogen-phthalate*

In making this compound for use as a hardening agent the following method has been found to be most suitable. Dry phthalic acid is dissolved in a small volume of anhydrous hot methanol and then dry hexamethylenetetramine is added in a portion so as to have a slight excess of acid over what is required for a molecular ratio. When the mixture is hot the solution is complete. The solution is dried at a low temperature, say in the range of 212° F., and a vacuum of between 20 and 25 inches.

It is to be observed in the making of the mono-hexamethylenetetramine-di-hydrogen - phthalate that only dry materials are to be used and that the presence of water should be avoided. Secondly the batch size should be decided upon which will permit the completion of the batch in the shortest possible time and thirdly, an approximate 5% excess of acid is desirable because even a slight excess of hexamethylenetetramine renders the product hygroscopic and fourthly avoid all high temperatures and do not heat the product above 212° F. especially when the material is almost dry because under higher temperatures a new compound is formed spontaneously which has value as a plasticizing agent but which is of no value as a hardening agent. Fifthly it is preferable that the operation should be performed upon days of low or normal humidity or that humidity control should be practiced.

*Example III—Hexamethylenetetramine-nitrate-formaldehyde*

One equivalent of dry hexamethylenetetramine is dissolved in an equivalent of formaldehyde, that is a 37½% by weight aqueous formaldehyde solution. An equivalent of concentrated nitric acid is then gradually poured into the above solution with vigorous stirring. Cooling is called for inasmuch as this operation evolves a considerable amount of heat. The hot concentrated solution is then poured into a fairly large volume of dry acetone and the acetone mixture is preferably cooled, the product being stirred vigorously. The hexamethylenetetramine-nitrate-formaldehyde which is precipitated out of the acetone mixture is separated by filtration or centrifuging and the product is preferably washed with an additional quantity of dry acetone. The material is now ready to be dried in a vacuum oven, I would say at 25 inch vacuum and a temperature which is below 212° F. This product is snow white, crystalline in structure, readily pulverizable and quite stable.

This compound can be prepared equally well by first dissolving concentrated nitric acid in a cold solution consisting of an equivalent of formaldehyde, that is a 33½% by weight aqueous solution, and then hexamethylenetetramine is slowly added to the solution with vigorous stirring and efficient cooling. This method, however, requires great precautions inasmuch as the formaldehyde-nitric acid solution is very explosive and is unstable even at room temperatures.

*Example IV—Hexamethylenetetramine-stearate*

Stearic acid is first fused and then an equivalent of dry hexamethylenetetramine is stirred in, the temperature being only high enough that the whole mass fuses into a clear liquid and this clear liquid is then allowed to cool or may be put into a vacuum oven and there may be dried prior to cooling. The product is a rather soft wax-like compound.

As stated previously, these examples are merely illustrative as there are many compounds which provide hexamethylenetetramine addition products, such as for example salicylic acid, but as a general fact the production of these hexamethylenetetramine addition product hardening agents is a relatively simple matter requiring no expensive equipment or expensive processing.

*Example V—Hexamethylenetetramineresinate addition compounds*

Hexamethylenetetramine, dry or aqueous, forms addition products with resins containing free phenolic (OH) groups, that is resins such as phenol-aldehyde, specifically phenol-formaldehyde, and various natural resins such as gum accroides, dragon's blood, etc. The product is most useful in the case of resins in the fusible or "A" stage and the resins may be either liquid or solid, in which latter case preferably pulverized, although solutions of resins can likewise be used.

In the production of these hexamethylenetetramineresinate addition compounds a receptacle such as a kettle or mixer, jacketed for cooling and with an agitator or mixing arms for stirring is convenient. A pulverized resin, for example, is placed into the mixing device and aqueous formaldehyde is added in a quantity sufficient to provide the required number of reactive methylene groups to carry the resin upon subsequent heating to the desired ultimate stage of infusibility. Instead of formaldehyde other aldehydes may be used. The product is thoroughly commingled and the surfaces of the pulverized grains are thoroughly wetted with the aldehyde and to the thus wetted resin grains I then add the quantity of ammonia necessary to combine with the formaldehyde and the batch is cooled while being stirred for a period of from 10 to 30 minutes and the hexamethylenetetramineresinate addition compound is formed without requiring external heating and the product is uniformly dispersed and adherently attached to the particles of resin as an extremely uniform coating. This addition compound coating is no longer water soluble and the water is readily released and may be removed by being dried at relatively low temperatures, either in a vacuum oven or in air currents. The drying should be carried out at temperatures not exceeding 150° F. where the melting point of the resin is to remain unaltered and is preferably carried out at about a temperature of 120° F. The product may be filter pressed if desired to expedite drying and this is possible due to the fact that the addition compound is not water soluble, whereas a mere admixture of hexamethylenetetramine and resin would leave the formed product in the water solution.

In this drying operation no special precautions need be taken except with respect to the fact that advancement of the resin takes place at temperatures somewhat above 150° F. However, the product does not sublime as hexamethylenetetramine is known to do.

The production of this hexamethylenetetramineresinate addition compound is not only simple and positive, but calls for equipment of only moderate cost. Hexamethylenetetramine in aqueous solution provides a product having low vapor tension and in fact it is difficult to evaporate such product to dryness and for this reason very special equipment and great skill is needed in producing uniform lots of hexamethylenetetramine. This addition product, however, has no very great affinity for water and in fact is substantially insoluble in water and therefore is readily dried.

As a direct statement the total cost of producing the hexamethylenetetramine addition product directly on the resin based on the present market price of raw materials and based on its equivalent reactive methylene groups is only 17½ cents per pound, whereas hexamethylenetetramine is being sold in large quantities at 35 cents per pound.

The hexamethylenetetramineresinate addition product is such that no hexamethylenetetramine can be readily extractible from a properly prepared mix by water in spite of the great solubility of hexamethylenetetramine in water and in spite of the fact that hexamethylenetetramine when exposed to a moist atmosphere will absorb more than enough water to liquefy the product.

While I have described the use of the aqueous hexamethylenetetramine product produced in situ in the presence of the pulverized resin, it is likewise true that I may start out with an aqueous solution of hexamethylenetetramine and by adding this to a resin and by commingling for a sufficient length of time to bring the solution of hexamethylenetetramine into contact with all of the resin surfaces I thereby produce my hexamethylenetetramineresinate addition product which thereafter has little or no solubility in water and the vapor tension of the product is approximately that of water as there is no hexamethylenetetramine in solution and, furthermore, the water is in an external phase, thus the water may be readily eliminated as by drying, separation, etc.

Instead of starting out with aqueous hexamethylenetetramine I may use a pulverized hexamethylenetetramine in dry anhydrous form and with a pulverized resin which contains some traces of water by ball milling this hexamethylenetetramine in the presence of the pulverized resin and a slight amount of moisture I produce my hexamethylenetetramineresinate addition product thoroughly coated on to the surfaces of the particles or grains of resin.

As stated previously, I may use a liquid or solid resin and I may use a resin solution as a starting basis. A slight amount of moisture is required to carry on the reaction. The reaction, however, requires no heating and by this means the hexamethylenetetramine is in molecular combination with the resin at whatever surfaces have been exposed thereto in the mixing operation. Therefore the dispersion in the form of an addition product is throughout the resinous mass to the ultimate limit as permitted by the particular form of resin containing reactive phenolic (OH) groups.

That this is so is directly indicated by the fact that on a hot plate heated to a temperature of 310° F. thin films of this hexamethylenetetramineresinate addition product hardened resins show a very homogeneous structure and there is only an unappreciable amount of bubbling and boiling and this bubbling and boiling decreases as the size of the resin particles decreases, whereas with a mere mixture of resin and hexamethylenetetramine there is violent boiling and blistering and the film is not at all homogeneous and, as a matter of fact, the hardening under these conditions is more localized rather than general. Furthermore, as previously stated, the hexamethylenetetramine cannot be readily extracted with water as can be done with mere admixtures.

The product is particularly useful for either hot or cold molding and can be formed on any synthetic or natural resins containing some free phenolic (OH) groups and, as in resinification it is these free phenolic (OH) groups which are to be inactivated or reacted upon, the addition compound is available in the closest juxtaposition to its reactive component when subsequently heated for further resinification reaction.

As to uses, the hexamethylenetetramineresinate addition product cures more rapidly and cures at a lower temperature if desired and there is less liberation of ammonia in the reaction and the product is therefore useful in the hot and cold molding arts for the production of various mechanical and electrical purposes where resin is required as a bond and, furthermore, is exceptionally useful where the resin is to be placed in aqueous colloidal dispersion, inasmuch as the hexamethylenetetramineresinate addition product is not soluble in water and therefore particularly in moist or wet mixes such as in the introduction of resins at the beaters of a paper mill. Also for use as a bond in the manufacture of plywood there is no loss of hexamethylenetetramine; in the production of plywood laminae the hardening agent remains with the resin instead of penetrating with the water into the fibres which would leave the resin behind with a deficiency of hardening agent; and in the manufacture of various abrasive bodies which are cold molded various aqueous moistening media will not cause a segregation of the hexamethylenetetramine component from the resin. In short, this hexamethylenetetramineresinate addition product provides a fusible potentially reactive synthetic resin which may be compounded with organic or inorganic fillers such as are ordinarily used with other potentially reactive resins in order to provide a hot or cold molding composition wherein the resin acts as a bond for the filler or for that matter where the filler acts as a modifying agent for the resin.

While in general acids can unite with hexamethylenetetramine to form hexamethylenetetramine addition compounds, there are nevertheless definite physico-chemical limitations that are encountered. Thus as the strength of the acid diminishes, so too does its affinity for hexamethylenetetramine diminish, so that the hexamethylenetetramine in hexamethylenetetramine-stearate is far less firmly held than in mono-hexamethylenetetramine - di - hydrogen - phosphate—so that hexamethylenetetramine-stearate under certain conditions behaves more like a mixture of hexamethylenetetramine plus stearic acid, in contrast to, for example, the hexamethylenetetramine-phosphate where the decomposition mechanism is such as to result in the formation of organic nitrogen compounds.

The physico-chemical characteristics of the hexamethylenetetramine compound may be such as to render impractical or impossible its isolation, thus it is virtually impossible to prepare the hexamethylenetetramine-formate or salicylate and it is only with the greatest difficulty that the hexamethylenetetramine-mono-chloracetate can be prepared in pure form. (These compounds are unstable and undergo a more or less spontaneous decomposition.)

The hexamethylenetetramine addition compounds which I have found most useful as hardening agents are listed by me as Group A.

Group A

Mono - hexamethylenetetramine-tri-hydrogen-citrate, mono - hexamethylenetetramine-tri-hydrogen - phosphate, mono - hexamethylenetetramine-di-hydrogen-oxalate, di-hexamethylenetetramine-di-hydrogen-oxalate, di-hexamethylenetetramine - di - hydrogen-di-magnesium-di-oxalate, hexamethylenetetramineresinate, mono-hexamethylenetetramine-di-hydrogen-succinate, di - hexamethylenetetramine - di - hydrogen-succinate, hydro-sulfite-formaldehyde, mono-hexamethylenetetramine-di-hydrogen-phthalate, hexamethylenetetramine-nitrate-formaldehye, hexamethylenetetramine-abietate, hexamethylenetetramine-sebacate, hexamethylenetetramine–aniline-phthalate, the hexamethylenetetramine-borates, hexamethylenetetramine - phthalate, the hexamethylenetetramine-tartrates, mono-hexamethylenetetramine-aniline-oxalate, mono-hexamethylenetetramine-phthalate, hexamethylenetetramine-triethanolamine-oxalate, hexamethylenetetramine-triethanolamine-phthalate, mono-hexamethylenetetramine - diethylene - triamine-mono - hydrogen-oxalate, mono-hexamethylenetetramine - triethylene-tetramine - mono-hydrogen - oxalate, mono-hexamethylenetetramine-amyl-amine-mono-hydrogen-oxalate.

The hexamethylenetetramine salts and/or addition products of the following acids: stearic, sebacic, oleic, linoleic, palmitic, lauric.

The hexamethylenetetramine salts and/or addition products of acids derived from oils such as tung oil, cocoanut oil, castor oil, sardine oil, cotton seed oil, corn seed oil, soya bean oil, etc.

In general the triple addition compounds formed by a reaction between hexamethylenetetramine, an organic base, and a polybasic, preferably organic, acid.

In general triple addition compounds formed by a reaction between hexamethylenetetramine, an organic acid and various aldehydes, e. g., mono-hexamethylenetetramine-di-hydrogen-oxalate-formaldehyde.

There are other hexamethylenetetramine addition compounds which act as hardening agents and which may be useful for certain purposes but these products give relatively mediocre results from the standpoint of strength, water resistance, electrical properties, etc., when compared to those listed under Group A, and these products are listed as compounds of the following acids under Group B.

Group B

Acetic, propionic, butyric, and in general the fatty acids of the methane series with less than eight carbon atoms, malic, maleic, etc.

The addition compounds of the groups listed may be further segregated into groups wherein the basis of differentiation is dependent upon some functional criteria such as speed, flow, lubricative, value, etc., or suitability for specific lines of work such as hot or cold molding. It should be borne in mind that there may be a certain degree of overlapping between the classes of the following functional Group C and the lines of demarcation are not sharply defined and in general are dependent upon the physico-chemical environments of the admixtures.

*Functional Groups C*

1. *Bubble suppressive types.*—Hexamethylenetetramineresinate, mono-hexamethylenetetramine-tri-hydrogen-citrate, mono-hexamethylene-tetramine-tri-hydrogen-phosphate, mono-hexamethylenetetramine-di - hydrogen - oxalate, di-hexamethylenetetramine-di - hydrogen - oxalate, di - hexamethylenetetramine - di - hydrogen - di - magnesium-di-oxalate.

2. *For speedy cures.*—Hexamethylenetetramineresinate, mono-hexamethylenetetramine-di-hydrogen-succinate, di-hexamethylenetetramine-di-hydrogen-succinate. Mono-hexamethylenetetramine-oxalate is also quite fast. (Compounds such as di-chlor-nitro-phenol impart an added kick at the end.)

3. *Speed to the rubbery stage only.*—Hydro-sulfite-formaldehyde in conjunction with compounds such as mono-hexamethylenetetramine-oxalate, or better the succinate.

4. *Maximum strengths for cold molded abrasive products.*—Hexamethylenetetramineresinate, blends of hexamethylenetetramine-oxalate with phthalate, mono-hexamethylenetetramine-tri-hydrogen-phosphate. Modifiers such as para-nitro-phenol, etc., are helpful—ball milling appears to be essential for the attainment of maximum strength.

5. *Fluxing aids—for good flows.*—Mono-hexamethylenetetramine-di-hydrogen-phthalate, hexamethylenetetramine-nitrate-formaldehyde, hexamethylenetetramine-abietate, hexamethylenetetramine - sebacate, hexamethylenetetramine-aniline-phthalate.

6. *Lubricating types.*—The hexamethylenetetramine salts of the following acids: stearic, sebacic, oleic, linoleic, palmitic, lauric, and acids of oils in general such as tung oil, cocoanut oil, castor oil, sardine oil, cotton seed oil, corn seed oil, soya bean oil, etc.

7. *Filler types.*—Hexamethylenetetramine-borates, hexamethylenetetramine-abietate.

8. *For slowing-up cures.*—Hexamethylenetetramine - abietate, hexamethylenetetramine - phthalate.

9. *Anti-flow compounds (in hot molding work).*—The hexamethylenetetramine - borates, the hexamethylenetetramine-oxalates, the hexamethylenetetramine-tartrates.

10. *Specific hardeners for the condensation products derived from caramel, aniline, glycerine, and accroides gum.*—Mono-hexamethylenetetramine - oxalate, mono-hexamethylenetetramine - aniline-oxalate.

11. *Oil soluble types.*—The compounds listed below are more or less soluble in tung oil—in no case are the compounds extremely soluble in this oil,—the maximum hexamethylenetetramine concentration is best obtained through the use of blends of these oil soluble types and preferably an excess of acid should be used. In general the hexamethylenetetramine addition compounds derived from the higher fatty acids, e. g., oleic, stearic, the fatty acid of tung oil, etc.

12. *Useful for hot molding work.*—Hexamethylenetetramineresinate, hexamethylenetetramine-nitrate-formaldehyde, mono-hexamethylenetetramine-phthalate, the hexamethylenetetramine-borates. A blend of these is best—preferably with the addition of some modifiers.

The above compounds or preferably blends thereof will tolerate limited additions of all other hexamethylenetetramine addition compounds and still yield good strengths, flows, cures, etc., without giving rise to sticking, staining, sweating, blistering or otherwise seriously impairing the mechanical or electrical qualities of the finished product. These additions should be looked upon as modifiers and, with this in mind, as an aid in making the selection the above tables wherein the compounds are grouped as regards some specific factor such as flow, and speed, etc. should be consulted. Modifiers other than hexamethylenetetramine addition compounds may be found helpful (e. g., para-nitro-phenol, alpha-nitro-naphthalene, etc.).

13. *Compounds suitable for cold molding work.*—Mono-hexamethylenetetramine-di-hydrogen-oxalate, di-hexamethylenetetramine-di-hydrogen-oxalate, mono-hexamethylenetetramine-tri-hydrogen-phosphate.

These materials should be finely pulverized and preferably ball milled where a solid resin is produced in order to obtain optimum strengths and minimum curing intervals. Here too, as in the case of the hot molding work, the same remarks as regards the incorporation of limited quantities of other hexamethylenetetramine addition compounds hold.

In general the hexamethylenetetramine addition products will induce reactions of a type more or less similar to those wherein hexamethylenetetramine is used, that is, in instances where hexamethylenetetramine is non-reactive, then too these addition compounds are equally non-reactive so far as the bringing about of resinification or hardening reactions are concerned, though various side reactions may take place. Reactions wherein hexamethylenetetramine addition compounds are used in lieu of hexamethylenetetramine, while broadly speaking following a somewhat similar course, nevertheless show definite divergencies both among themselves and from the straight hexamethylenetetramine. Usually this difference is related to the speed of the reaction, the amount of frothing, hardness, or, broadly speaking, the ultimate mechanical properties of the material.

From a consideration of the above facts it may be concluded that the field wherein the hexamethylenetetramine addition compounds may be utilized is substantially the same as that of hexamethylenetetramine. The use of a hexamethylenetetramine addition compound in lieu of hexamethylenetetramine often results in commercial advantages and imparts unique properties to the intermediate or finished products, and from this point of view these addition compounds may be looked upon as an improved type of material that may be substituted for hexamethylenetetramine. As typical of instances where the use of the hexamethylenetetramine addition compounds results in unique advantages may be stated the ease with which resin mixes are obtainable which in the hardening process yield masses possessed of weights fully equal to 98–99% of the original, whereas when hexamethylenetetramine is used a loss in weight of from two to four times as great is usually gotten. Then again there are instances where it is desired to fuse, under conditions of atmospheric pressure, thin layers, say of about ⅛ inch in thickness, of a pulverized resin containing hardener so as to yield a thick film or thin sheet substantially free of bubbles, smooth and homogeneous in structure, this result is quite readily attainable when using homo-hexamethylenetetramine-di-hydrogen-oxalate properly incorporated with a pulverized "A" stage resin, whereas when hexamethylenetetramine is used as hardening agent, even under the most favorable conditions, a porous, frothy-like mass, results.

From this it would appear that the use of the hexamethylenetetramine addition products often permits the attainment of ultimate products that cannot be gotten when hexamethylenetetramine is used, so that in a sense these addition compounds have a greater field of utility, or otherwise broaden the field of utilization of the phenol-aldehyde type resins.

Some typical reactions of hexamethylenetetramine addition compounds follow:

Hexamethylenetetramine addition compounds, such as for example mono-hexamethylenetetramine-di-hydrogen-oxalate, react with ordinary phenol in much the same manner that hexamethylenetetramine does, but the reaction differs from instances where this latter compound is used in that the reaction is more vigorous and the resulting mass is far less porous and is mechanically much harder and stronger.

When carrying out the above reaction between a phenol and an addition product such as mono-hexamethylenetetramine-di-hydrogen-oxalate, it is possible, when using care and optimum proportions of these ingredients and proper temperatures, to bring about a reaction of such speed that a hardened product is obtained from these initial raw materials within a few seconds or minutes, and due to the relative freedom from the evolution of gases or volatile materials it appears that with the use of some counteracting pressure or some equivalent method of manipulation, one can, for specific purposes, manufacture hardened non-porous resinous products in a relatively simple manner. The substitution of phenol sulphonic acid for a part of the phenol furthers this reaction, that is, it permits of a still easier attainment of this goal, though usually these latter products are mechanically not as strong and are not possessed of the same resistance to water so that their sphere of usefulness would be somewhat limited.

The preceding remarks with respect to the use of phenolic bodies are also applicable to instances where urea is used, though the reaction does not proceed with such vigor.

With compounds such as urea certain of the hexamethylenetetramine addition compounds such as the above oxalate react quite vigorously. that is, much more readily than hexamethyleneteramine.

With gum accroides specific addition compounds, particularly the mono-hexamethylenetetramine-di-hydrogen-oxalate and compounds such as mono-hexamethylenetetramine-aniline-oxalate, react much more readily than hexamethylenetetramine, yielding faster cures and a stronger more coherent mass.

With specifically prepared products obtained by a procedure that comprises the reaction or condensing of caramel with gum accroides, glycerine, or aniline, it has been found that comparatively very strong products are obtainable when the mono-hexamethylenetetramine-di-hydrogen-oxalate or the mono-hexamethylenetetramine-hydrogen-aniline-oxalate is used as a hardening agent. On the other hand when hexamethylenetetramine is used for this purpose very unsatisfactory results are gotten, thus films on the hot plate are granular, non-coherent and possessed of practically no strength, whereas with the above referred to hardening agents films are obtainable which are comparable to those when a phenol-aldehyde type resin is used.

These hexamethylenetetramine addition products are quite soluble in or compatible with various phenols and, as previously stated, many of these react rapidly with little or no bubbling or frothing and therefore a coating liquid for various fillers of an organic or inorganic nature may be provided by merely dissolving or mixing the phenol, cresol, xylenol, etc., or mixtures of these with a quantity of these addition products and this solution may be used without resinification reaction for various cold molding operations inasmuch as the coating is not sticky and the mix may readily be leveled, etc., without addition of other more solid or less liquid ingredients. The mixtures may be dried if desired, but this is optional, and may be rolled or processed as in the making of molding compounds, or to the coated grains may be added pulverized hardening resins and preferably resins having hexamethylenetetramine addition products blended or coated thereon when such products may be produced as dry granular mixtures which may be hot or cold molded. This step provides a very useful coating liquid for the purpose of coating abrasive grains inasmuch as the product has long keeping qualities and will upon heat treatment have relatively low loss in volatiles and under these conditions is useful in the production of abrasive bodies such as wheels, paper and cloth backed abrasives, etc. The addition of dry pulverized resin is advantageous where a dry granular mix is called for. Furthermore, the product is advantageous for various surface coatings and for various cements and if mixed with a suitable percentage of inert mineral filler to give body to the product and if necessary the admixture of dry pulverized resin therewith, or a liquid resin of somewhat higher viscosity, a cementitious coating of potentially reactive character which does not bubble greatly is obtained which may be used as a cement for the purpose of bonding slabs or segments or other portions of grinding wheels or other articles, as, for example, in the making of either natural stone or artificially bonded pulp grinding wheels of the built up type.

I claim:

1. A potentially reactive phenolic resin including a hexamethylenetetramine addition product comprising mono-hexamethylenetetramine-di-hydrogen-oxalate.

2. A potentially reactive phenolic resin including a hexamethylenetetramine addition product comprising mono-hexamethylenetetramine-di-hydrogen-phthalate.

3. A potentially reactive phenolic resin suitable for press molding including a mixture of hexamethylenetetramine addition products comprising mono-hexamethylenetetramine-di-hydrogen-oxalate, di-hexamethylenetetramine-di-hydrogen-oxalate, and mono-hexamethylenetetramine-di-hydrogen-phosphate.

4. A potentially reactive phenolic resin suitable for hot press molding including a mixture of hexamethylenetetramine addition products comprising hexamethylenetetramineresinate, monohexamethylenetetramine-hydrogen-oxalate and a combined plasticizing and hardening agent comprising a hexamethylenetetramine addition compound.

5. A potentially reactive phenolic resin suitable for hot press molding including a mixture of hexamethylenetetramine addition products comprising hexamethylenetetramineresinate, mono-hexamethylenetetramine-hydrogen-oxalate and a combined plasticizing and hardening agent comprising mono-hexamethylenetetramine-hydrogen-phthalate.

6. A potentially reactive phenolic resin suitable for cold molding including a mixture of hexamethylenetetramine addition compounds comprising mono-hexamethylenetetramine-di-hydrogen-oxalate, di-hexamethylenetetramine-di-hydrogen-oxalate, and mono-hexamethylenetetramine-tri-hydrogen-phosphate.

7. A potentially reactive phenolic resin suitable for cold molding including a mixture of hexamethylenetetramine addition compounds comprising mono-hexamethylenetetramine-di-hydrogen-oxalate, di-hexamethylenetetramine-di-hydrogen-oxalate, and mono-hexamethylenetetramine-tri-hydrogen-phosphate, spread over the resin body as a uniform coating.

8. A potentially reactive phenolic resin produced from gum accroides and including as a hardening agent mono-hexamethylenetetramine-di-hydrogen-oxalate.

9. A potentially reactive phenolic resin including a hexamethylenetetramine addition product wherein hexamethylenetetramine is combined with a polybasic acid in such proportions that the number of hexamethylenetetramine groups is less than the number of acid groups in the said acids.

10. A potentially reactive phenolic resin including a hexamethylenetetramine addition product wherein the special hexamethylenetetramine addition product is a triple addition product of hexamethylenetetramine, an acid, and formaldehyde.

11. A potentially reactive phenolic resin including a hexamethylenetetramine addition product wherein the hexamethylenetetramine addition product is specifically characterized in that the acid with which the hexamethylenetetramine is combined contains aside from the acidic groups other potentially reactive or available ammonia ($NH_3$) or $N\equiv$ fixing groups or structures.

12. The potentialy reactive resin of claim 5 comprising a hexamethylenetetramine addition product and including mono-hexamethylenetetramine-hydrogen-phthalate as a plasticizer.

EMIL E. NOVOTNY.